United States Patent [19]

Ahn

[11] Patent Number: 4,611,622

[45] Date of Patent: Sep. 16, 1986

[54] DRAIN FOR CONDENSATE FROM FLUE GAS

[75] Inventor: Hongsik Ahn, Chesterfield, Mo.

[73] Assignee: Intertherm Inc., St. Louis, Mo.

[21] Appl. No.: 670,261

[22] Filed: Nov. 13, 1984

[51] Int. Cl.[4] .............................................. B08B 3/00
[52] U.S. Cl. .................................. 137/145; 137/142; 237/55
[58] Field of Search .................. 122/20 B; 237/55, 53; 126/116 R, 99 R, 99 A; 165/DIG. 2, 134 DP; 137/145, 142, 247.11; 210/513, 532, 539; 110/203

[56] References Cited

U.S. PATENT DOCUMENTS

| 4,309,947 | 1/1982 | Ketterer | 110/203 |
| 4,372,487 | 2/1983 | Hollister | 122/20 B X |
| 4,403,572 | 9/1983 | Gerstmann et al. | 122/20 B |

FOREIGN PATENT DOCUMENTS 202412 12/1982 Japan ................................. 110/203

*Primary Examiner*—Henry Bennett
*Attorney, Agent, or Firm*—Jerome A. Gross

[57] ABSTRACT

For use with a hydrocarbon-fueled furnace whose secondary heat exchanger so cools the combusted gas as to condense much of its water vapor, and having a blower to the flue, a combined trap and drain is provided for the condensate formed both in the heat exchanger and in the flue. At the base of the flue is a standpipe whose upper overflow outlet is connected to a dip tube. Between the level of its lower end and the overflow level is a side inlet into the standpipe, connected to a tube leading downward from the heat exchanger's condenser. When the furnace blower applies both negative pressure to the condenser and positive pressure to the flue, the water levels in the trap and tube adjust to balance out these pressures.

3 Claims, 1 Drawing Figure

DRAIN FOR CONDENSATE FROM FLUE GAS

FIELD OF THE INVENTION

This invention deals with condensate traps and particularly those used to drain condensate formed in a high efficiency heat exchanger, as for a furnace burning hydrocarbon fuel.

BACKGROUND OF THE INVENTION

Where a heat exchanger system so reduces the temperature of combustion gases as to condense much of the water vapor therein, problems arise how to dispose of the condensate. As to that part of the condensate which forms within a tubed heat exchanger, the condensate may partially clog the tubes unless suction is applied. Such suction is therefore applied to a manifold at the outlet side of the heat exchanger. This gives rise to the problem how to drain condensate from the negative pressure in the manifold to the atmosphere.

Such a suction blower, as shown in my U.S. Pat. No. 4,478,206 dated Oct. 23, 1984, also supplies positive pressure in the flue stack to partly remedy the lack of natural draft of the cool flue gases. As the cool flue gases rise slowly, further condensation occurs in the flue. This presents the problem how to provide drainage of condensate from the flue stack without loss of such positive pressure.

In U.S. Pat. No. 4,194,488, dated Mar. 25, 1980, condensate formed in a tubed heat exchanger and condensate formed in a flue stack are shown to be separately drained by simple drain outlets, not protected by any traps. The communication of atmospheric pressures through such drains would seemingly impair the positive or negative pressures necessary for optimum operation of the system. It is not known whether other patents or publications deal with this problem.

SUMMARY OF THE INVENTION

The purposes of the present invention include: providing a trap and drain for both the condensate formed in the heat exchanger and that formed in the flue stack, without impairing the negative pressure in the manifold evacuated by the suction blower, and without interfering with the draft and positive pressure therein which the blower provides.

Briefly stated and without limitation, these objects are achieved by providing a water trap in a downward extension of a vertical flue stack, which is subjected to the pressure of the suction blower. Condensate forming in the flue stack can thus drop directly into the reservoir, or standpipe, at the base of the flue stack. A drain tube from the outlet manifold of the heat exchanger enters the trap at a level below its overflow level. Overflow takes place through a dip tube, within the trap, extending downward from the overflow outlet to below the level of the drain tube inlet.

As suction is exerted in the collector manifold by the suction blower, the trap preserves the operativeness of the suction system, so condensate continues to drain from the collector manifold. As to the positive pressure exerted within the flue stack by the discharge of the suction blower, the trap prevents the loss of this positive pressure; thus both the induced draft and the positive pressure in the flue stack are preserved.

DESCRIPTION OF THE PREFERRED EMBODIMENT

Figure 1:
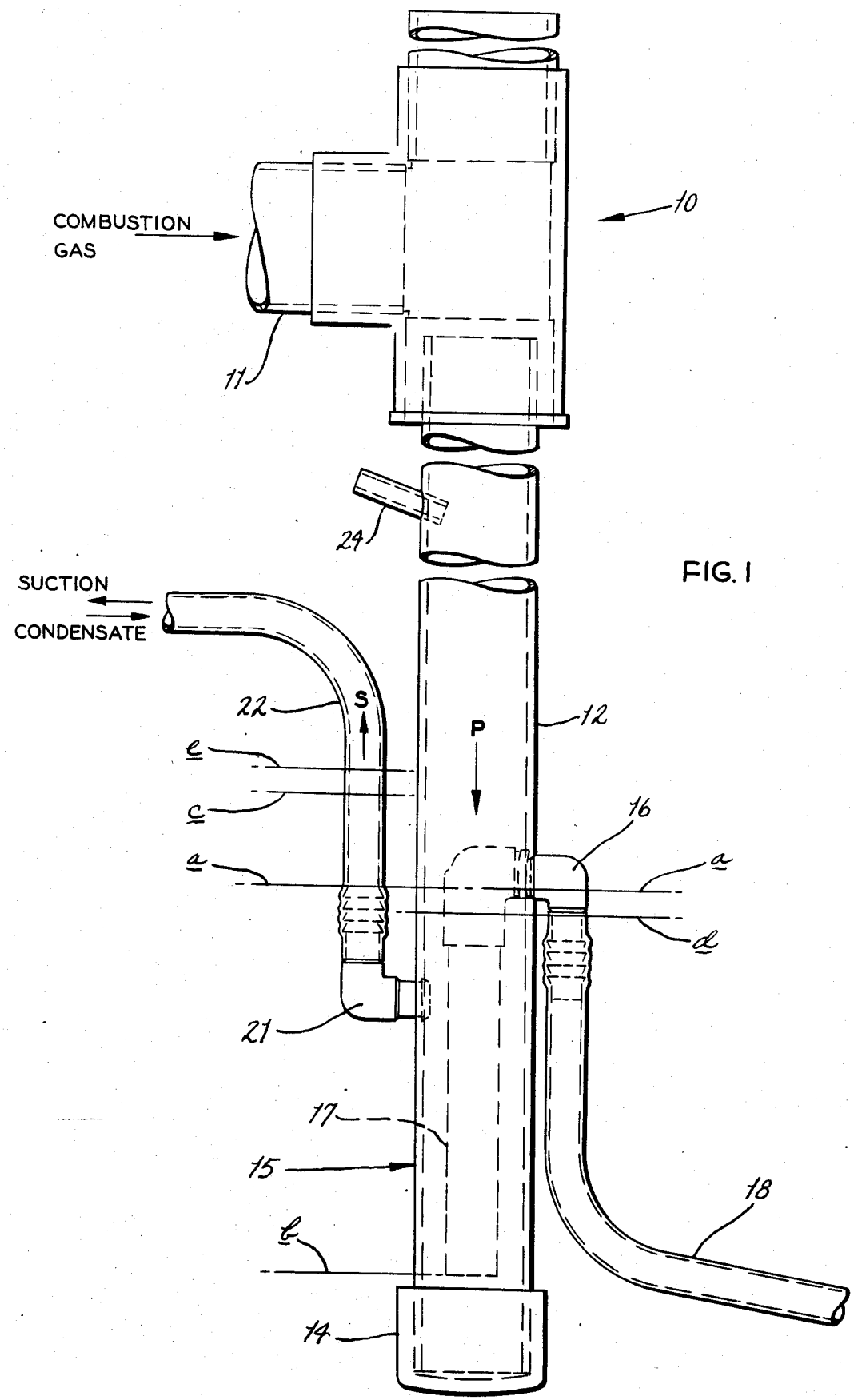
FIG. 1 is an elevational view, partly broken away, of a condensate trap and drain embodying the present invention, showing as well the water level therein under various operating conditions.

A vertical flue stack, generally designated 10, having a side inlet 11 for combustion gases, includes a downward-extending portion 12, which in the preferred embodiment extends to floor level, at which it is closed by an inverted cap 14. The lower portion of the flue stack 10 is thus constituted as a standpipe generally designated 15, having an overflow level a, which is established by the overflow outlet means. In the embodiment illustrated, this consists of a tubular connector 16 through its side wall; a dip tube 17 connected on its inner side and extending downwardly to a trap level b, spaced somewhat above the inner surface of the cap 14; and a condensate drain tube 18 outwardly of the standpipe 15. Condensate forming in the flue stack 10 will drop directly into its standpipe portion 15.

Entering the side wall of the standpipe 15, spacedly between the overflow level a into the trap level b, is a collector drain inlet fitting 21 which extends upwardly to connect to a downward-leading collector drain tube 22. This is connected to the manifold drain outlet of such a suction-assisted heat exchanger, for example, of the type shown in my said U.S. Pat. No. 4,474,307. In the absence of suction, as when the furnace is not operating, condensate from such collector manifold will drain, through the downward-leading collector drain tube 22 and the collector drain inlet fitting 21, into the standpipe 15. The present invention assures the continuation of such drainage during operation of the blower, despite the suction exerted by it within the downward-leading collector drain tube 22 and the positive pressure exerted by it within the flue stack 10.

Initially the standpipe 15 is filled with water to the overflow level a, and water rises within the collector drain inlet fitting 21 to this level. When the furnace is first put into operation, the suction S within the downward-leading collector drain tube 22 combines with the positive pressure P within the downward-extending portion 12 to raise the level of water within the downward-leading collector drain tube 22 to the initial operating level c, drawing water from the standpipe 15 and thus lowering its level to the minimum level d. Therefore in designing the system, the collector drain inlet fitting 21 is to be spaced sufficiently below the overflow level a to protect against the drop in water level from the overflow level a to the minimum level d.

While the furnace is operating, condensate continues to form, raising the level in the collector drain tube 22 to a continuous operating level e, which is reached and maintained stable when the overflow level a within the standpipe 15 is reached. Condensate forming thereafter, draining either through the collector drain tube 22 or dropping directly in the flue stack 10, will cause continuous outflow through the condensate drain tube 18. Whenever the furnace discontinues operation, such outflow will continue as the water level within the downward-leading collector drain tube 22 falls again to the overflow level a.

The present invention thus preserves and maintains the suction S in the collector manifold of such heat exchanger, as well as the positive pressure P in the flue stack, while drainage of condensate proceeds unimpeded.

The dimensional requirements of the present water-balanced trap and drain are readily met. For example, in a chosen furnace having a suction-assisted secondary heat exchanger, the suction S exerted in the drainage tube 22 from the collector manifold equals $-1.0''$ of water column; while the pressure P exerted in the flue 10 equals $+0.12''$ of water column. These negative and positive pressures combine on start-up to raise the level of water in the tube 22 to the level c, and as drainage continues, to the higher level e for continuous operation. The apparatus therefore must be so positioned that the level e is below the level at which condensate is to drain from the collector manifold of the heat exchanger. To determine the height of such operating level e above the overflow level a of the standpipe 15, one simply adds the positive flue pressure, in inches of water column, to the negative pressure of the collector manifold. Thus, in the chosen case the level e above the trap overflow level would be $0.12''$ plus $1.0''$ equals $1.12''$.

Since on start-up the water level in the standpipe immediately drops to the minimum level d as water rises in the tube 22, the drain inlet fitting 21 must be so spaced downward as to be unaffected by the drop of water level to the minimum level d. The actual drop in water level on start-up is calculated as equal to the:

$$\frac{\text{internal area of tube 22}}{\text{internal area of standpipe 15}} \times \text{total pressure differential}$$

Applied to the chosen example:

$$(0.1963 \div 1.625) \times 1.12 = 0.1352''$$

The foregoing calculations illustrate that the dimensional requirements of the present combined trap and drain fall easily within the range of practical sizes. In operation, the rise and fall of water level is small; hence, for clarity of illustration, the drawing exaggerates these level changes.

Optionally a pressure tap 24 may be employed, in the stack downward-extending portion 12 above the standpipe 15, leading to a safety switch, not shown, in an electrical system which controls the combustion of fuel in the furnace served by the trap apparatus shown. If so used, it is so connected as to prevent combustion in absence of the positive pressure P in the fuel stack 10.

The principles of this invention apply to modified uses, for example, the system such as shown in said U.S. Pat. No. 4,194,488 in which both the flue and the tubed secondary heat exchanger may be subject to unequal positive pressures; as well as to other systems wherein unequal pressures in gases are to be maintained despite need for draining condensate. In such case, the source of the lesser pressure is to be connected to the drain inlet fitting 21.

I claim:

1. For maintaining a desired sub-atmospheric pressure in a flue gas at a selected point in a system burning hydrocarbon fuel from which water vapor condenses, a trap and drain comprising a standpipe in communication with and below a flue,
    means to establish an overflow level of said standpipe and to drain condensate therefrom,
    a dip tube connected to said overflow outlet means and extending downward within said standpipe to a trap level above the base of the standpipe, and
    downward-leading means, entering said standpipe at a level between the trap level and the overflow level, to conduct to the standpipe condensate from such selected point in the system at which such sub-atmospheric pressure is to be maintained,
    whereby after the standpipe is filled with water to such overflow level, such negative pressure is maintained by the rise of water from said standpipe into said downward-leading means.

2. A condensate trap and drain for a gas-conducting system in which a plurality of pressures other than atmospheric are to be maintained while condensate drains from the sources of such pressures, comprising a standpipe positioned to receive condensate from the source of the greater of such pressures,
    overflow outlet means to establish an overflow level of said standpipe and to drain condensate therefrom,
    a dip tube connected to said overflow outlet means and extending downward within said standpipe to a trap level above the base of the standpipe,
    a drain inlet into the standpipe at a level between the trap level and the overflow level, and
    a downward-leading tube connecting said drain inlet of the standpipe to a lesser of such pressures,
    whereby after the standpipe is filled with water to such overflow level, both the greater and lesser pressures are maintained by the rise of water from said standpipe into said downward-leading tube.

3. A condensate trap and drain for that type of heat exchanger having a blower, in advance of a flue, to induce suction in a collector manifold of the heat exchanger as well as positive pressure in the flue, the collector manifold having a condensate drain outlet, comprising a standpipe at the base of the flue,
    overflow outlet means to establish an overflow level of said standpipe and to drain condensate therefrom,
    a dip tube connected to said overflow outlet means and extending downward within said standpipe to a trap level above the base of the standpipe,
    a collector drain inlet into the standpipe at a level between the trap level and the overflow level, and
    a downward-leading tube connecting such collector manifold drain outlet to the said collector drain inlet of the standpipe,
    whereby after the standpipe is filled with water to such overflow level, both the positive pressure in the flue and the suction in the collector manifold are maintained by the rise of water from said standpipe into said downwardleading tube, while permitting the drainage of condensate from both the collector manifold and the flue.

* * * * *